(12) United States Patent
Chan

(10) Patent No.: US 12,509,878 B2
(45) Date of Patent: Dec. 30, 2025

(54) SYSTEM AND METHOD FOR TREATING A SUBSTRATE USING A WATERPROOFING MEMBRANE

(71) Applicant: OceanLink USA, Inc., Lodi, NJ (US)

(72) Inventor: Rizal S. Chan, Alpine, NJ (US)

(73) Assignee: OCEANLINK USA, INC., Lodi, NJ (US)

(*) Notice: Subject to any disclaimer, the term of this patent is extended or adjusted under 35 U.S.C. 154(b) by 650 days.

(21) Appl. No.: 16/537,314

(22) Filed: Aug. 9, 2019

(65) Prior Publication Data
US 2021/0040725 A1    Feb. 11, 2021

(51) Int. Cl.
*E04B 1/66* (2006.01)
*B32B 7/12* (2006.01)
*B32B 27/08* (2006.01)
*B32B 37/02* (2006.01)
(Continued)

(52) U.S. Cl.
CPC .............. *E04B 1/665* (2013.01); *B32B 7/12* (2013.01); *B32B 27/08* (2013.01); *B32B 37/02* (2013.01); *B32B 37/24* (2013.01); *E02D 31/02* (2013.01); *B32B 2037/243* (2013.01);
(Continued)

(58) Field of Classification Search
CPC ......... E04B 1/665; B32B 37/24; B32B 37/02; B32B 27/08; B32B 7/12; B32B 2305/30; B32B 2037/243; B32B 2419/00; B32B 2307/7265; E02D 31/02
See application file for complete search history.

(56) References Cited

U.S. PATENT DOCUMENTS 3,741,856 A  6/1973  Hurst
3,853,682 A  12/1974 Hurst
3,900,102 A  8/1975  Hurst
(Continued)

FOREIGN PATENT DOCUMENTS

CN    1050376 C    3/2000
CN    1268431 A    10/2000
(Continued)

OTHER PUBLICATIONS

Taian Cadeer Geosynthetics Co., LTD; 2015; TPO Waterproofing Membrane; Retrieved using Archive. Org (Year: 2015).*

*Primary Examiner* — Nathan L Van Sell
(74) *Attorney, Agent, or Firm* — Mannava & Kang, P.C.

(57) ABSTRACT

A waterproofing membrane system for waterproofing a concrete substrate is disclosed. The waterproofing membrane system may comprise any number of waterproofing membrane segments. Each waterproofing membrane segment may include a first layer comprising a thermoplastic elastomeric waterproof material using advanced polymerization and squeeze technology. Each waterproofing membrane segment may also include a second layer segment comprising a first adhesive, such that the second layer is disposed on the first layer. Each waterproofing membrane segment may also include a third layer segment comprising a protective coating to provide mechanical protection and ease of handling for the first layer and the second layer. In some examples, the third layer may be disposed on the second layer. Each waterproofing membrane segment may also include a fourth layer segment comprising a second adhesive, wherein the fourth layer is disposed under the first layer.

6 Claims, 4 Drawing Sheets

(51) Int. Cl.
  *B32B 37/24*   (2006.01)
  *E02D 31/02*   (2006.01)
(52) U.S. Cl.
  CPC ... *B32B 2305/30* (2013.01); *B32B 2307/7265* (2013.01); *B32B 2419/00* (2013.01)

(56) References Cited

U.S. PATENT DOCUMENTS

| | | | |
|---|---|---|---|
| 4,215,160 A | 7/1980 | Rosenberg et al. | |
| 4,386,981 A | 6/1983 | Clapperton | |
| 4,396,665 A | 8/1983 | Rowe | |
| 4,442,148 A | 4/1984 | Stierli | |
| 4,595,636 A | 6/1986 | Wiercinski et al. | |
| 4,600,635 A | 7/1986 | Wiercinski et al. | |
| 5,316,848 A | 5/1994 | Bartlett et al. | |
| 6,235,365 B1 | 5/2001 | Schaughency et al. | |
| 6,500,520 B1 | 12/2002 | Wiercinski et al. | |
| 6,898,917 B2 | 5/2005 | Durning et al. | |
| 7,219,479 B2 | 5/2007 | Durning et al. | |
| 7,459,180 B2 | 12/2008 | Hamdar et al. | |
| 7,550,187 B2 | 6/2009 | Seth et al. | |
| 7,968,171 B2 | 6/2011 | Seth et al. | |
| 8,079,184 B2 | 12/2011 | Wiercinski et al. | |
| 8,298,661 B2 | 10/2012 | Samanta et al. | |
| 8,298,662 B2 | 10/2012 | Samanta et al. | |
| 8,453,405 B2 | 6/2013 | Wiercinski et al. | |
| 8,475,909 B2 | 7/2013 | Seth et al. | |
| 8,609,213 B2 | 12/2013 | Wiercinski et al. | |
| 8,713,879 B2 | 5/2014 | Wiercinski et al. | |
| 8,931,229 B2 | 1/2015 | Wiercinski et al. | |
| 9,394,464 B2 | 7/2016 | Wiercinski et al. | |
| 9,476,196 B2 | 10/2016 | Wiercinski et al. | |
| 2003/0219563 A1* | 11/2003 | Zanchetta | E04D 5/02 428/40.1 |
| 2007/0044397 A1 | 3/2007 | Wiercinski et al. | |
| 2010/0173110 A1 | 7/2010 | Wiercinski et al. | |
| 2010/0173112 A1 | 7/2010 | Wiercinski | |
| 2012/0180933 A1 | 7/2012 | Wiercinski et al. | |
| 2013/0065020 A1* | 3/2013 | Loftus | E04D 5/12 428/143 |
| 2014/0271440 A1* | 9/2014 | Constantz | E04D 13/1618 423/430 |
| 2016/0040440 A1 | 2/2016 | Wiercinski et al. | |
| 2018/0284085 A1* | 10/2018 | Arigo | C09J 7/381 |

FOREIGN PATENT DOCUMENTS

| | | | |
|---|---|---|---|
| CN | 1064497 C | 4/2001 | |
| CN | 1165415 C | 9/2004 | |
| CN | 1268431 C | 8/2006 | |
| CN | 1863671 B | 1/2011 | |
| CN | 102015283 A | 4/2011 | |
| CN | 1960856 B | 2/2012 | |
| CN | 102196902 B | 11/2014 | |
| CN | 102725139 B | 7/2015 | |
| CN | 103625077 B | 10/2015 | |
| WO | WO-2007024787 A2 * | 3/2007 | B32B 15/14 |

* cited by examiner

SYSTEM AND METHOD FOR TREATING A SUBSTRATE USING A WATERPROOFING MEMBRANE

TECHNICAL FIELD

This patent application relates generally to a waterproofing membrane system and method, and more specifically, to systems and methods for waterproofing a concrete substrate and other related waterproofing applications.

BACKGROUND

Laminate sheets are typically used for waterproofing concrete. These laminate sheets, however, are normally applied to a concrete substrate that has already been formed, such as a building foundation. As a result, such laminate sheets are applied on a cured concrete surface. In other concrete applications, laminate sheets can also be applied to concrete that is freshly-poured, or on surfaces that are not yet cured.

Conventional laminate sheets offer limited waterproofing capabilities when applied to either cured or non-cured concrete substrates. The integrity of a waterproofing membrane system is generally based on materials, size, dimensions, and arrangement of various layers. In many cases, conventional laminate sheets do not form an adequate water barrier or are cumbersome to use and install, which also results in poor waterproofing. In addition, conventional laminate sheets lack durability in extreme weather conditions and typically cannot accommodate heavy foot traffic or other physical wear.

As a result, a more robust waterproofing membrane system and method may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, conventional laminate sheets offer limited waterproofing capabilities when applied to either cured or non-cured concrete substrates. They lack durability and cannot accommodate heavy physical wear or extreme conditions. Use and installation of conventional laminate sheets are also cumbersome. In many cases, conventional laminate sheets do not provide an adequate water barrier for which they are created.

Figure 1:
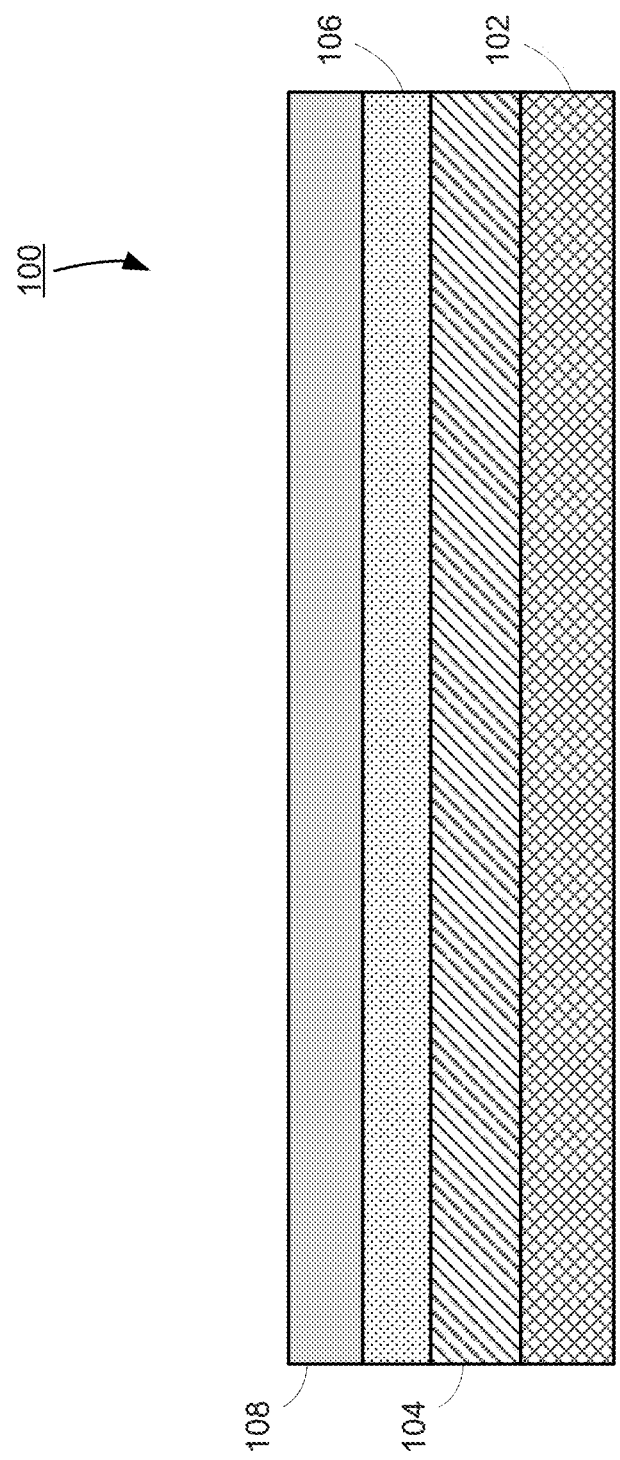
FIG. 1 illustrates a cross-section of a waterproofing membrane system, according to an example.

FIG. 1 illustrates a cross-section of a waterproofing membrane system 100, according to an example. As shown, the waterproofing membrane system 100 may include various layers. For example, the waterproofing membrane system 100 may have a first layer 102, a second layer 104, a third layer 106, and a fourth layer 108.

The first layer 102 may be a membrane layer. The membrane layer may be made of a thermoplastic elastomeric waterproof material using advanced polymerization together with squeeze technology having high tensile strength and resistant to oxidation and puncture. For example, the membrane may include a thermoplastic polyolefin (TPO). In another example, the membrane may include other various materials, such as elastomer (POE) plastic, EVA plastic, plasticizer, antioxidant, etc.

The second layer 104 may be a carrier sheet. In an example, the carrier sheet may include a fabric made of polypropylene. In some examples, the carrier sheet may be made of 100% polypropylene. Alternatively, the carrier sheet may be made of a fabric that includes a mix of polypropylene and polyethylene.

The third layer 106 may be an adhesive layer. In an example, the adhesive layer may be made of C5 petroleum resin. The adhesive layer may provide bonding of the membrane and concrete upon contact, as well as reduce migration of water and vapor traveling between these two materials.

The fourth layer 108 may be a protective coating. In an example, the protective coating may be made of quartz sand ($SiO2$) or other similar material(s). In some examples, the protective coating may have a reflectivity of 4.5%. Depending on application or purpose, the reflectivity may be greater than, equal to, or lesser than 4.5%. The protective coating may also provide mechanical protection for the membrane, carrier sheet, and/or adhesive layer as well, so that the surface of the membrane or other layers, for example, may be more easily handled. This may be especially important in transportation, storage, and application the waterproofing membrane on a concrete substrate.

Figure 2:
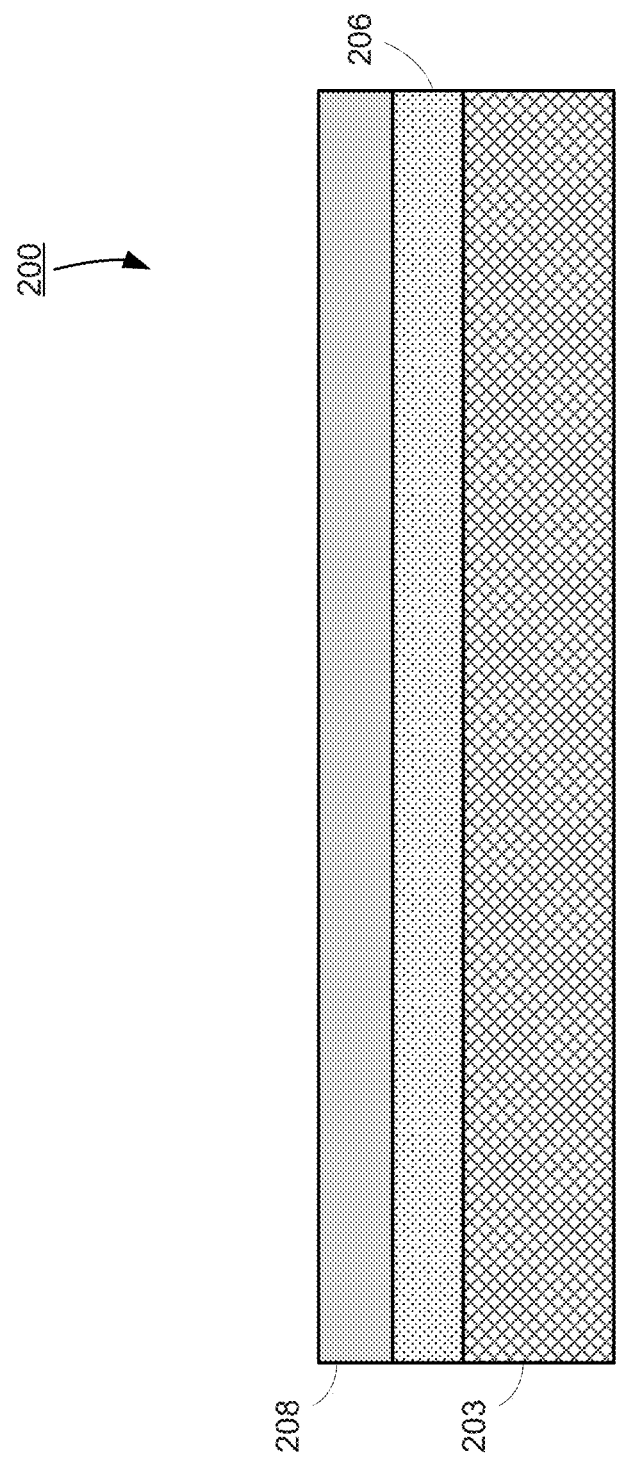
FIG. 2 illustrates a cross-section of a waterproofing membrane system, according to another example.

FIG. 2 illustrates a cross-section of a waterproofing membrane system 200, according to another example. As shown, the waterproofing membrane system 200 may be similar to waterproofing membrane system 100 of FIG. 1 and include various layers. In the waterproofing membrane system 200 of FIG. 2, however, there may be only three total layers. The waterproofing membrane system 200 may have a first layer 203, a second layer 206, and a third layer 208. The second layer 206 may be an adhesive layer similar to that of the third layer 106 of FIG. 1, and the third layer 208 may be a protective coating similar to that of the fourth layer 108 of FIG. 1. The first layer 203 may be a carrier sheet that incorporates a membrane-like features. In effect, the first layer 203 may be an integrated version of the first layer 102 and the second layer 104 of FIG. 1.

Other various examples or variations may also be provided. For example, the layers of FIGS. 1 and 2 may be interchangeable, substituted, and/or arranged in an order different than what is shown.

Figures 3A, 3B, 3C:
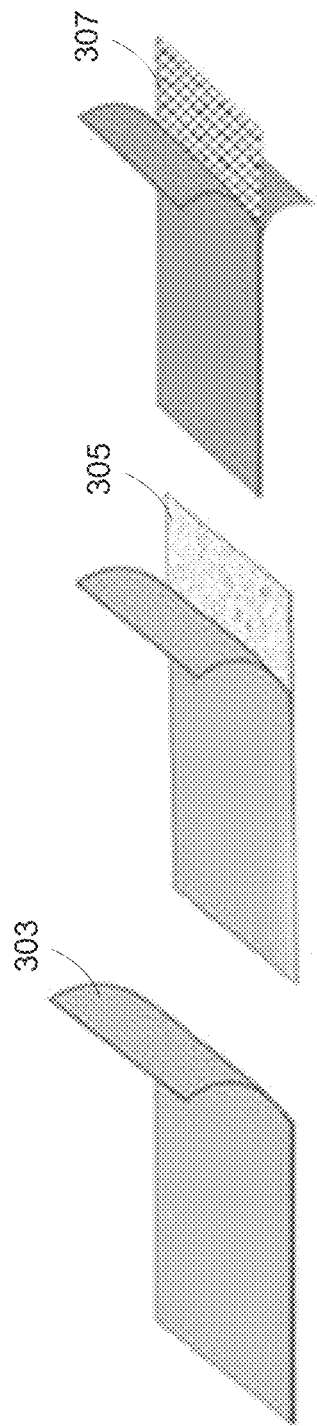
FIGS. 3A-3C illustrate cross-sections of various waterproofing membrane systems, according to an example.

FIGS. 3A-3C illustrate cross-sections of various waterproofing membrane systems, according to an example. FIG. 3A may depict a waterproofing membrane system that includes a single sheet 303. Sheet 303 may be the waterproof membrane system 100 of FIG. 1 or the waterproof membrane system 200 of FIG. 2. Here, sheet 303 may be a homoegenous waterproofing membrane system that does not include any other layer or component. Advantages of a homogeneous waterproofing membrane system is its relatively lightweight nature, making it easier to transport, store, and install.

FIG. 3B may depict a waterproofing membrane system that includes sheet 303 and a backing sheet 305. In an example, the backing sheet 305 may be a woven or a non-woven material. The backing sheet 305 may help with strength, durability of the waterproofing membrane system, or may help with use and installation of the waterproofing membrane system. It may also help protect the waterproofing membrane during transportation, storage, and application. Other various advantages may be apparent.

FIG. 3C may depict a waterproofing membrane system that includes two sheets 303 with a reinforcement sheet 307 therebetween. In an example, reinforcement sheet 307 may be a woven or a non-woven material. reinforcement sheet 307 may help with strength, durability of the waterproofing membrane system, or may help with use and installation of the waterproofing membrane system. It may also help protect the waterproofing membrane during transportation, storage, and application. Other various advantages may be apparent.

Figure 4:
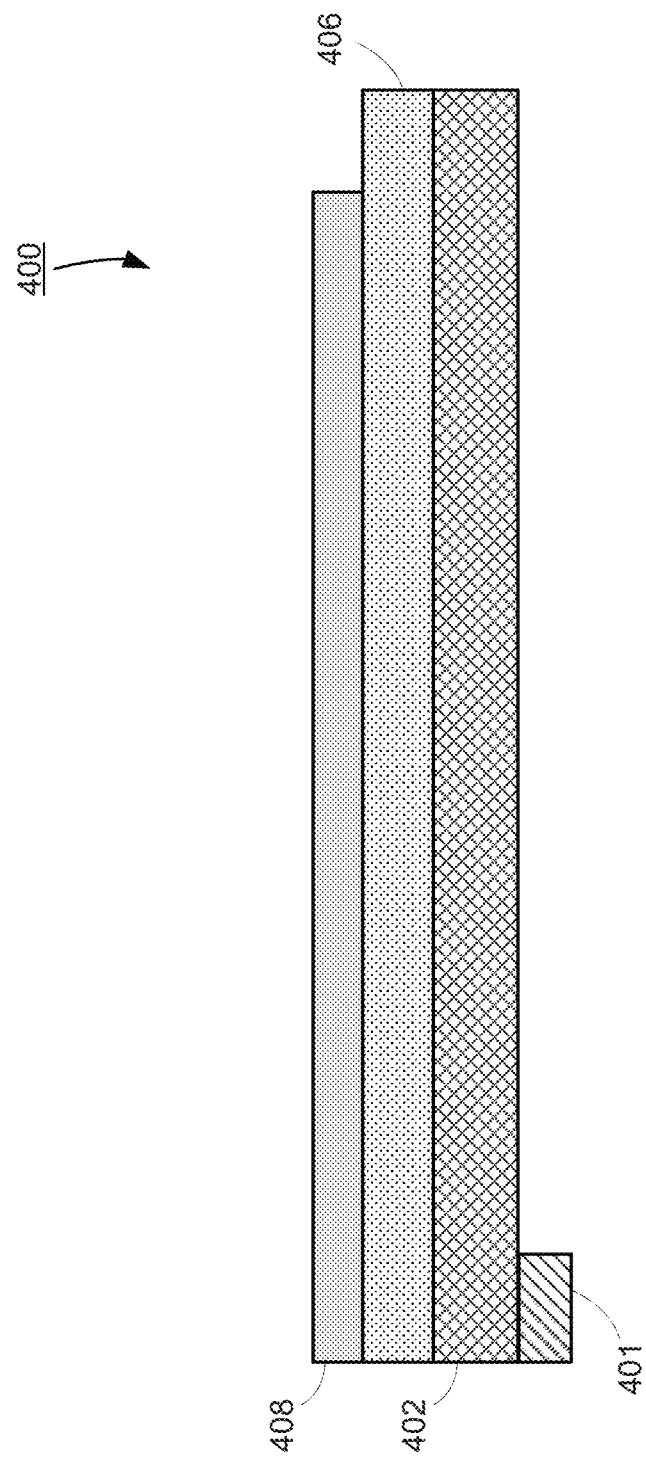
FIG. 4 illustrates a cross-section of a waterproofing membrane system, according to another example.

FIG. 4 illustrates a cross-section of a waterproofing membrane segment 400, according to another example. As shown, the waterproofing membrane segment 400 may be used to form a waterproofing membrane system similar to that of the waterproofing membrane system 100 of FIG. 1 and may also include various layers. In some examples, the waterproofing membrane segment 400 of FIG. 4 may a first layer segment 402, a second layer segment 406, a third layer segment 408, and a fourth layer segment 401.

In some examples, the first layer segment 402 may be a membrane layer similar to the first layer 102 of FIG. 1. In some examples, the first layer segment 402 may be a composite layer similar to the first layer 203 of FIG. 2. The second layer segment 406 may be an adhesive layer similar to that of the third layer 106 of FIG. 1. The third layer segment 408 may be a protective coating similar to that of the fourth layer 108 of FIG. 1. The fourth layer segment 401 may be another adhesive layer. In some examples, the adhesive layer of the fourth layer segment 401 may be similar or different from the adhesive layer of the second layer segment 406.

In some examples, the first layer segment 402 may have a length of approximately 2 m and a thickness of less of approximately 0.9 mm. The second layer segment 406 may have a length of approximately 2 m and a thickness of approximately 0.2 mm. In some examples, the second layer segment 406 may be disposed on the first layer segment 402. The third layer segment 408 may have a length shorter than the first layer and the second layer. For example, the third layer segment 408 may have a length of 1.9 m, such that when the third layer segment is disposed on the second layer segment there may be an exposed portion of the second layer segment 406. The third layer segment 408 may have a thickness of approximately 0.1 mm. The fourth layer segment 401 may a length of approximately 10 cm and a thickness of approximately 0.1 mm.

It should be appreciated that a waterproofing membrane system may be formed by interconnecting any number of waterproofing membrane segments. For instance, the exposed portion of the second layer segment of one waterproofing membrane segment may be attached to the fourth layer segment of another waterproofing membrane segment, and so forth, to form a waterproofing membrane system of any desired length or size. It should be appreciated that waterproofing membrane system comprising the plurality of waterproofing membrane segment may have an approximate overall thickness of 1.2 mm.

In an example, the waterproofing membrane system and method may follow the specifications outlined below in TABLE 1.

TABLE 1

| ITEM | | INDEX | | |
|---|---|---|---|---|
| | | H | L (Fleece back) | P |
| The resin thickness of Middle fabric, mm≥ | | | — | |
| Maximum tension, N/cm≥ | | — | 200 | 250 |
| Tension strength, Mpa≥ | | 12 | — | — |
| Maximum tension elongation, %≥ | | — | — | 15 |
| Fracture elongation, %≥ | | 500 | 250 | — |
| Heat treatment size change rate %≤ | | 2 | 1 | 0.5 |
| Low temperature bend | | −40° C. No crack | | |
| Water lightness | | 0.3 Mpa, 2 h, No seepage | | |
| Attack resistance | | 0.5 kg m, No seepage | | |
| Static charge resistance | | — | — | 20 kg, No seepage |
| Seam strip strength, N/mm≥ | | 4.0 or Membranes break | | 3.0 |
| Right-angle tear strength, N/mm≥ | | 60 | — | — |
| Trapezoid tear strength N≥ | | — | 250 | 450 |
| Bibulous rate (70° C. 168 h), % | After soaking≤ | | 4.0 | |
| | Air-cure later≥ | | −0.4 | |
| Heat aging (115° C.) | Time | | 672 h | |
| | Appearance | No blister, flaw, delamination, coherence, hole | | |
| | Tensile strength retention, %≥ | — | 90 | 90 |
| | Elongation rate of | 90 | — | — |

TABLE 1-continued

| | | INDEX | | |
|---|---|---|---|---|
| ITEM | | H | L (Fleece back) | P |
| | keeping, %≥ | | | |
| | Low temperature bend | | −40° C., No crack | |
| Chemistry | Appearance | No blister, flaw, delamination, coherence, hole | | |
| | Tensile strength retention, %≥ | — | 90 | 90 |
| | Elongation rate of keeping, %≥ | 90 | — | — |
| | Low-temperature bending | | −40° C., No crack | |
| Artificial weather accelerated aging | Time | | 1500 h | |
| | Appearance | No blister, flaw, delamination, coherence, hole | | |
| | Tensile strength retention %≥ | — | 90 | 90 |
| | Elongation rate of keeping %≥ | 90 | — | — |
| | Low temperature bend | | −40° C., No crack | |

In another example, the waterproofing membrane system and method may follow the specifications outlined below in TABLE 2 and TABLE 3.

TABLE 2

| Dimensions (Nominal) | TPO Waterproofing Membrane System |
|---|---|
| Thickness | 0.046 in. (1.2 mm) |
| Roll size | 6 ft. 6 in. × 65 ft. 7 in. (2 m × 20 m) |
| Roll area | 430 ft² (40 m²) |
| Roll weight | 132 lbs (60 kg) |
| Minimum side/end laps | 3 in. (75 mm) |

TABLE 3

| Property | TPO Waterproofing Membrane System |
|---|---|
| Color | White |
| Thickness | 0.046 in. (1.2 mm) |
| Lateral water migration resistance | Pass at 180 ft (55 m) |
| Low temperature flexibility | −40° C. no leaking |
| Resistance to hydrostatic head | 180 ft (55 m) |
| Elongation | 612% |
| Tensile strength, film | 2262 psi (15.6 MPa) |
| Crack cyclin at −9.4° F. (−23° C.), 100 cycles | Unaffected, Pass |
| Puncture resistance | 184 lbs (820 N) |
| Peel adhesion to concrete | 4 lbs/in. (700 N/m) |
| Lap peel adhesian at 72° F. (22° C.) | 6.85 lbs/in. (120 N/m) |
| Lap peel adhesian at 40° F. (4° C.) | 5 lbs/in. (900 N/m) |
| Permeance to water vapor transmission | 0/35 MPa × 2 h = 0.7 ng |

In yet another example, the waterproofing membrane system and method may follow the specifications outlined below in TABLE 4.

TABLE 4

| Property | Waterproofing Membrane |
|---|---|
| Color | White |
| Thickness | 0.046 in. (1.2 mm) |
| Lateral water migration resistance | Pass |
| Low temperature flexibility | No fracture at −22° F. (−30° C.) |
| Resistance to hydrostatic head | 0.5 kg*m, no leakage |
| Elongation | 900% |
| Tensile strength, film | 22.2 MPa |
| Crack cyclin at −9.4° F. (−23° C.), 100 cycles | Pass |
| Puncture resistance | 800 N |
| Peel adhesion to concrete | 5 lbs/in. (880 N/m) |
| Lap peel adhesian | 1480 N/m |
| Permeance to water vapor transmission | Standard |

Furthermore, in some examples, weathering between −40° C. through 110° C. may not affect the waterproofing membrane system. The waterproofing membrane system may be environmentally friendly as well, and may not include chlorine and other hazardous materials. The waterproofing membrane system may also be extremely durable and have an effective life of up to 50 years. The waterproofing membrane system may include crack resistance. This waterproofing membrane system may be suitable for the construction of exposed or non-exposed roof waterproof layer. It may also be easy to shape along any surface area to provide waterproofing. In additional to concrete application, the waterproofing membrane system described herein may also be used on light steel roof, not only to reduce the weight of roofing, and excellent saving materials, waterproof and anti-condensation, suit for large industrial plants, public buildings. Other various waterproofing applications may be provided as well, such as for drinking water reservoirs, toilets, basements, tunnels, grain depots, subways, reservoirs, commercial, public, residential applications, etc.

It should be appreciated that a thermoplastic polyolefin (TPO) waterproof membrane described herein may be choice material for waterproofing applications. By adopting advanced polymerization, which performs well with mechanical properties, high tensile strength, oxidation-resistance and resistance to puncture. Through the thermoplastic material, such as ethylene propylene diene terpolymer (EPDM), the main ingredients may include a composition of polyolefin elastomer (POE) and/or ethylene vinyl acetate (EVA). Other various materials or compositions may also be provided. As described herein, the waterproofing membranes may be engineered to provide a permanent and integral, adhesive bond to concrete. This unique bond may provide lateral water migration resistance and waterproofing performance for the life of the structure. In some scenarios, such compositions have been proven to resist the migration of water around and into the structure of below grade construction, even in situations when the membrane is damaged.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method of forming a waterproofing membrane system on a concrete substrate, the method comprising:
    providing a plurality of waterproofing membrane segments to form the waterproofing membrane system, each of the waterproofing membrane segments comprising:
        a first layer comprising a thermoplastic elastomeric waterproof material using advanced polymerization and squeeze technology;
        a second layer comprising a first adhesive, wherein the second layer has a same length as the first layer and is disposed on the first layer;
        a third layer comprising a protective coating to provide mechanical protection and ease of handling for the first layer and the second layer, wherein the third layer has a shorter length than the second layer and is disposed on the second layer to expose a portion of the first adhesive of the second layer; and
        a fourth layer comprising a second adhesive, wherein the fourth layer has a same length as the exposed portion of the first adhesive of the second layer and is disposed under the first layer; and
    interconnecting the plurality of waterproofing membrane segments to form a waterproofing membrane system, by attaching the exposed portion of the first adhesive of the second layer of one waterproofing membrane segment with the second adhesive of the fourth layer of another waterproofing membrane segment.

2. The method of claim 1, wherein the first layer comprises thermoplastic polyolefin (TPO).

3. The method of claim 1, wherein the first layer comprises at least one of an elastomer (POE) plastic, a EVA plastic, a plasticizer, and an antioxidant.

4. The method of claim 1, wherein the first adhesive and the second adhesive comprise C5 petroleum resin.

5. The method of claim 1, wherein the protective coating of the third layer comprises quartz sand ($SiO_2$).

6. The method of claim 1, wherein:
    a length of the first layer is approximately 2 m and a thickness of the first layer is less than 1 mm;
    the length of the second layer is approximately 2 m and a thickness of the second layer is less approximately 0.2 mm;
    the length of the third layer is shorter than the length of the second layer by approximately 10 cm and a thickness of the third layer is less approximately 0.1 mm; and
    the length of the fourth layer is approximately 10 cm.

* * * * *